United States Patent

[11] 3,532,152

[72] Inventor John W. Cartinhour
 Livingston, New Jersey
[21] Appl. No. 718,061
[22] Filed April 2, 1968
[45] Patented Oct. 6, 1970
[73] Assignee Foster Wheeler Corporation
 Livingston, New Jersey
 a corporation of New York

[54] MULTI-EFFECT EVAPORATOR
 14 Claims, 4 Drawing Figs.
[52] U.S. Cl. .................................................. 159/20;
 202/174; 203/11
[51] Int. Cl. ....................................................... B01d 1/08,
 B01d 1/12
[50] Field of Search .......................................... 159/2,
 2(MS), 17, 20, 22, 23, 28, 27B, (mems); 202/173,
 174; 203/10, 11

[56] References Cited
 UNITED STATES PATENTS
 378,843 2/1888 Lillie ....................... 159/46X
 2,073,738 3/1937 Faber ....................... 159/17
 2,929,443 3/1960 Beagle Jr., et al. ......... 159/20
 3,150,028 9/1964 Wennerberg ............... 159/28
 3,198,608 8/1965 Miller et al ................. 159/47X
 3,259,553 7/1966 Halbritter ................... 203/71X Primary Examiner—Norman Yudkoff
Assistant Examiner—J. Sofer
Attorneys—Richard S. Shreve Jr., John Maier III and Marvin A. Naigur ABSTRACT: A multi-effect evaporator enclosed in a single shell and containing flash chambers integral to the main structure. Incoming liquid is passed along sectioned upper and lower headers with vertical tubes therebetween along a sinuous path through said chambers in succession. From the top header, distributors discharge repeatedly into the respective flash chambers. These flash chambers comprise an upper tube sheet, a feed chamber above the tube sheet, a vapor chest below said tube sheet, and a brine chamber below said vapor chest. Steam passed to the steam chest, comparable to the vapor chests of the other effects condenses and heats the liquid portion in the tubes descending into the brine chamber. Vapors from the concentrate in the brine chamber pass to the vapor chest of the adjacent effect. The distillate from the vapor chest and the concentrate from the brine chamber are collected from the consecutive effects as products of the process.

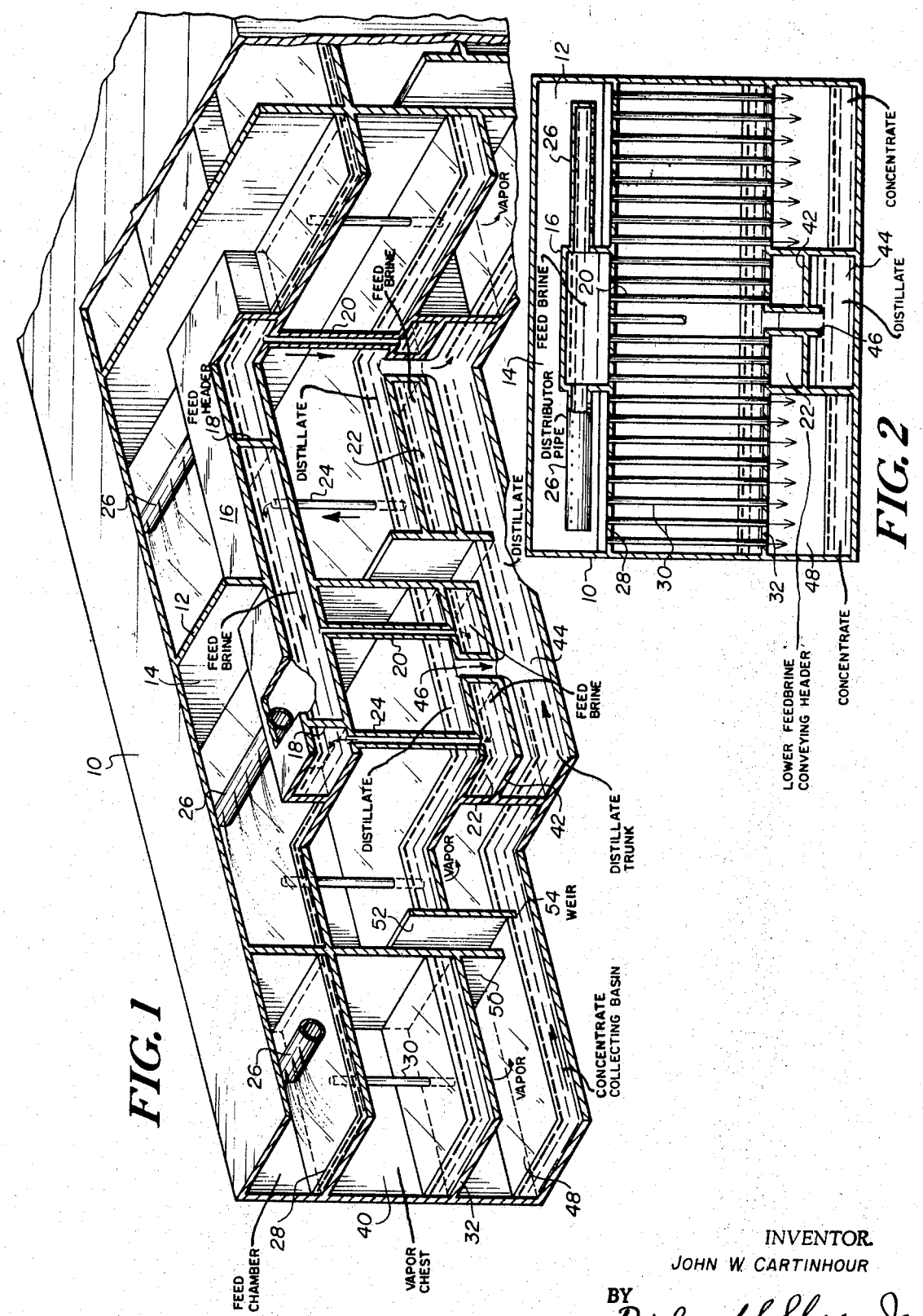

Patented Oct. 6, 1970

INVENTOR.
JOHN W. CARTINHOUR
BY Richard S. Shreve Jr
ATTORNEY

MULTI-EFFECT EVAPORATOR

Although the multiple effect evaporator system can produce water at a very attractive energy input per unit of product, the original equipment cost is discouragingly high. Combined costs are so high that the multiple effect evaporators have not been able to capture more than a very small fraction of the market.

The invention herein described costs substantially less than conventional multi-effect evaporators because it eliminates the water effect piping complex, separate heat regeneration exchangers, and water effect pumps. It has practically no limit as to size or capacity, occupies much less space than conventional units, and its design can be standardized for a very wide range of capacities. Furthermore, it may by very slight alterations incorporate a vapor recompression system which will further reduce energy input requirements for unit and product. In the drawings:

FIG. 1 is an isometric view of the multi-effect evaporator with parts broken away to show the contraction of the successive effects;

FIG. 2 is a transverse section through the evaporator shown in FIG. 1;

Figure 3:
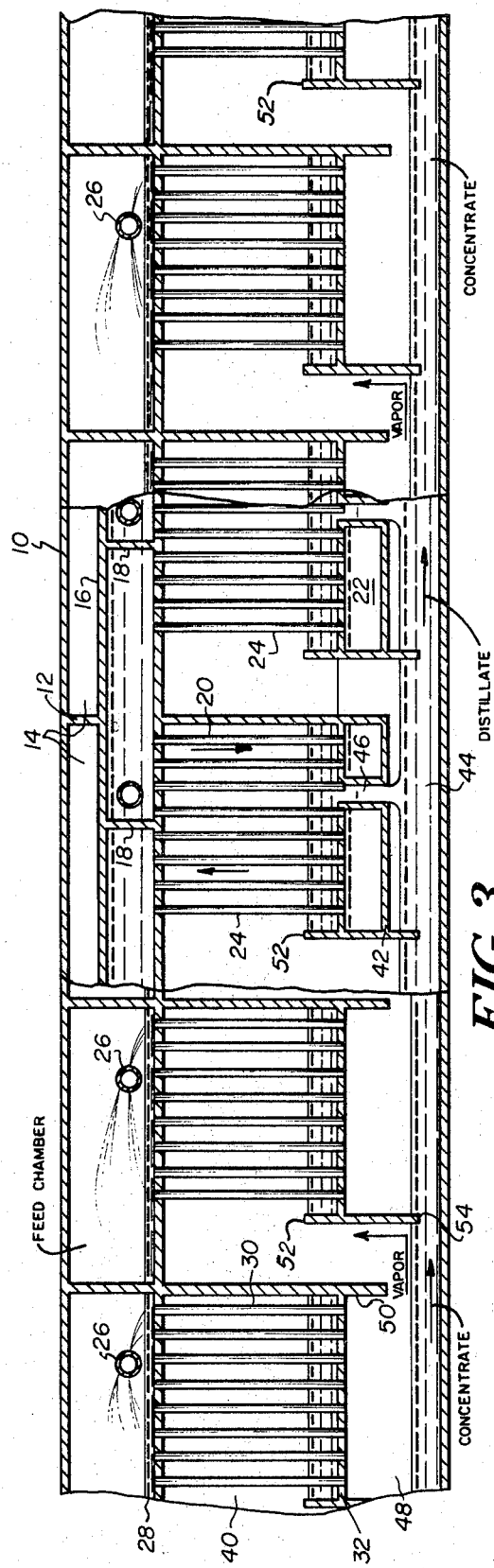
FIG. 3 is a longitudinal section staggered to conform to FIG. 1.

In the form shown in the drawing the entire multi-effect evaporator is enclosed in a single outside shell 10. As shown in FIG. 1, this shell is divided by transverse partitions 12 into consecutive feed distributing chambers 14, in which the separate effects take place. An upper feed conveying header 16 extends longitudinally through the partitions 12 and is divided by transverse partitions 18 located intermediate the partitions 12 into consecutive lengths.

In the first of these consecutive lengths defined by a partition 18, the bottom of the upper header forms impart an upper tube sheet from which, upstream of the divider or partition 18, descending tubes 20 extend through a lower tube sheet formed by the top of a lower feed conveying header 22. Beyond the partition 18, ascending tubes 24 extend up from the lower header 22 to the upper header 16.

Also in the first feed distributing chamber 14 ahead of the first header partition 12, as shown in FIG. 2, perforated distributor pipes 26 extend laterally from each side into the corresponding sides of the first feed chamber. The bottom of this chamber is formed by tube sheets 28 extending laterally from each side of the bottom of the header 16. Descending tubes 30 extend therefrom down to tube sheets 32 extending laterally from each side of the top of lower header 22.

Figure 4:
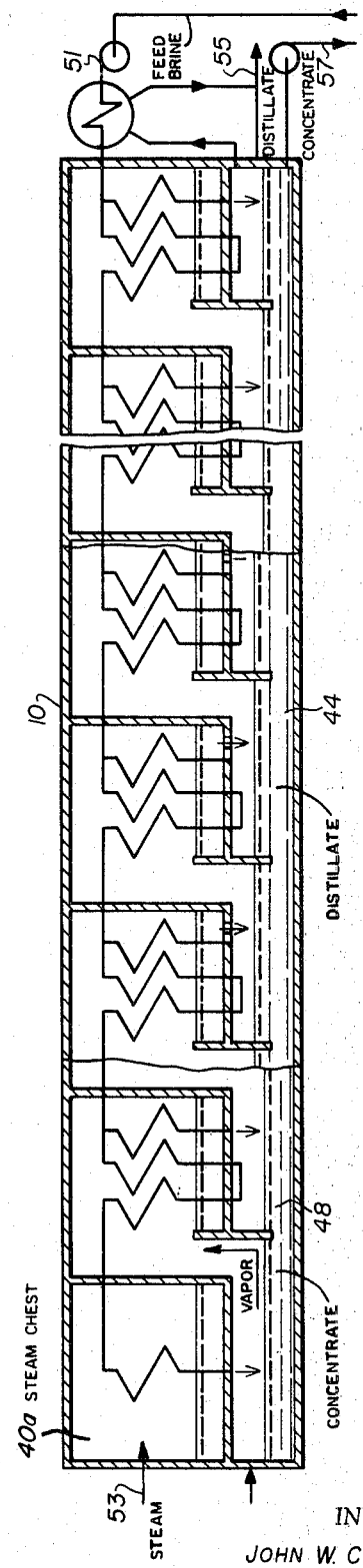
FIG. 4 is a flow diagram of the passage of fluids through the evaporator shown in the preceding views.

The liquid to be evaporated, such as cold sea water from a supply 51 shown in FIG. 4, enters the shell 10 through upper header 16. In the lowest temperature first effect, the greater part of the incoming sea water in the header 16 is stopped by the partition 18, and passes down the tubes 20 into the lower header 22. This header being stopped by the bottom of weir 52, the greater part of the sea water rises up through tubes 24 to upper header 16 beyond its partition 18. The greater part of the sea water thus pursues a sinuous path, alternately along the upper and lower headers, from the lowest onto the highest temperature effect.

This greater part of the incoming sea water is successively reduced by successive portions taken off to the respective effects by the distributors 26. Each such portion is spread over the tube sheet 28 for its effect, and passes down the tubes 30 thereof into the brine chamber 48 for that effect.

The heating medium such as steam supplied to the shell 10 from an outside source 53 shown in FIG. 4 enters the steam chest 40a outside of the tubes 20 and 30 between the tube sheets 28 and 32. The steam heats the sea water and condenses on the outside of the tubes and collects above the tube sheet 32. The lower header 22 has a horizontal partition 42 separating it from the bottom of the shell to form a distillate trunk 44 therebelow. The top of the lower header 22 has a drain opening into a pipe 46 passing through and below the partition 42 into the distillate trunk 44, which passes to the outlet 55 shown in FIG. 4, as a product of the process.

The heated sea water passes below the tube sheet 32 into a brine chamber 48. Vapors rising from the heated sea water in the chamber pass thereover and under the bottom of the partition 12, which terminates short of the bottom of the shell, forming a depending lip or inverted weir 50. Thereafter the rising vapors pass over the top of a flash chamber weir 52 into the succeeding vapor chest 40 to heat the sea water in the tubes 30 thereof. The bottom of the weir 52 forms an inverted weir 54 under which the concentrate passes to the bottom of the brine chamber below the tube sheet 30 of the next effect, and so on to the outlet 57 shown in FIG. 4, as a product of the process.

The steam from an outside source introduced into the chamber 40 is entirely condensed therein, with the result that no steam passes on therefrom. However, the heated sea water in the brine chamber 48 flashes into vapor which passes under the weir 50 and over the weir 52 to condense on the tubes 30 of the next effect. Thus the sea water in each effect is heated by vapor flashed from the brine heated in the preceding effect.

I claim:

1. A method of multiple effect evaporation which comprises passing liquid to be evaporated through a lower temperature effect to a consecutive higher temperature effect in a series of effects, distributing successive portions of said liquid to said consecutive effects while keeping the undistributed liquid passing through each effect separated from the liquid distributed to that effect, supplying steam to the highest temperature effect of the series in indirect heat exchange with the last remaining liquid portion distributed thereto to partially vaporize the same while completely condensing the steam therein, and passing the generated vapor from said distributed portion in said higher temperature effect to said lower temperature effect in indirect heat exchange with the preceding distributed liquid portion in said lower temperature effect and in indirect heat exchange with the undistributed liquid to be evaporated moving through said lower temperature effect.

2. A method as claimed in claim 1, in which the liquid to be evaporated is passed along a sinuous path from said lower temperature effect to said higher temperature effect in indirect heat exchange with the generated vapor from said higher temperature effect, and distributed from said path into the higher temperature effect.

3. A method as claimed in claim 1, in which the steam passed to said highest temperature effect is from an outside source.

4. A method as claimed in claim 1, in which said partially vaporized portion leaves an unvaporized concentrate which is collected with the concentrate from the other respective effects by gravity feed as a product of the process.

5. A method as claimed in claim 1, in which the condensate from the heating vapor in said higher temperature effect, which derives from a still higher temperature effect, is collected as a part of the product of the process.

6. A method as claimed in claim 5, in which the vapor passed to said lower temperature effect is in indirect heat interchange relation with another portion of said liquid, which vapor condenses to form a distillate and said distillate is collected with the distillate from the vapor in said higher temperature effect to form a product of the process.

7. Multiple effect evaporator comprising a horizontally elongated shell;
transverse partitions dividing said shell into consecutive effect chambers; horizontal upper and lower tube sheets;
upper and lower feed conveying headers extending longitudinally through said evaporator and transversely through said partitions and divided into consecutive lengths;
tubes in each effect comprising a downcomer set and an upcomer set extending between said headers and located between said headers and located between said partitions for passing incoming liquid in a sinuous path along said consecutive lengths and through said tubes in said effect chambers;

lateral distributors respectively extending from said upper header to discharge downwardly into other separate vertical tubes in said separate effects and then into a concentrate collecting basin in the bottom of each effect; all said tubes and the surrounding confined space comprising a vapor chest; and means for passing generated vapor from the basin in each preceding high temperature effect chamber to and about the tubes of the next consecutive lower temperature effect vapor chest.

8. Multiple effect evaporator as claimed in claim 7, in which said transverse partitions have respective apertures therein through which generated vapor from each preceding higher temperature effect chamber passes to the next subsequent lower temperature effect vapor chest.

9. Multiple effect evaporator as claimed in claim 7, in which each of said separate effects comprises, a feed chamber above said upper tube sheet, a vapor chest between said tube sheets, and said collecting basin being positioned below said vapor chest.

10. Multiple effect evaporator as claimed in claim 9, in combination with a longitudinal condensate duct connected to the bottom of each of said vapor chests, and said collecting basins being connected in sequence.

11. A multiple effect evaporator comprising an outer elongated shell and transverse partitions forming and separating said effects, each effect having an upper tube sheet, a lower tube sheet, a vapor chest between said tube sheets, and evaporating tubes extending between said upper tube sheet and lower tube sheet and through said vapor chest, said evaporator having a brine chamber extending longitudinally of said evaporator under said lower tube sheets and feed distributing chambers extending longitudinally of said evaporator above said upper tube sheet, said brine chamber being in vapor transmitting communication with the vapor chest of the next lower temperature effect except the first, a distillate trunk extending below said lower tube sheets and being in communication with the lower portions of the vapor chests through said lower tube sheets, an upper feed header extending longitudinally through said evaporator and directly over said upper tube sheets, a lower feed header extending longitudinally through each effect directly below said lower tube sheets, said upper header and said lower header having spaced dividers, other downcomer tubes and other upcomer tubes connecting said upper and lower headers, said dividers and said other upcomer tubes and said other downcomer tubes being located so that the incoming liquid will flow through said headers toward said higher temperature effects along a sinuous path and through said other tubes, a distributor pipe extending laterally from said upper feed header over each of said upper tube sheets to distribute the incoming liquid in said distributing chamber over the tops of said tube sheets to thereafter pass downwardly through said evaporating tubes and to said brine chamber where the liquid separates into brine and vapor, the latter of which passes into the adjacent vapor chest of the next lower effect to heat the evaporation and other tubes of that effect, condense on the outsides of said tubes and to gather on the lower tube sheet of that effect to flow into said distillate trunk.

12. The multiple effect evaporator defined in claim 11 further comprising a weir secured to the lower tube sheet of each effect except the highest effect, each weir being spaced from the adjacent partition of the next highest effect and extending upwardly and downwardly from said tube sheets to allow the vapor in the brine chamber below each effect to flow into the vapor chamber of the adjacent lower effect and to prevent distillate on each lower tube sheet from flowing into said brine chamber.

13. The multiple effect evaporator defined in claim 12 wherein said lower header extends centrally of said evaporator to divide said brine chamber into two portions, one on either side of said lower header.

14. The multiple effect evaporator defined in claim 13 wherein said distillate trunk extends below said lower header, said evaporator further comprising pipes extending from said distillate trunk upwardly to the lower tube sheets upon which said condensed vapor gathers to permit said condensate to flow into said distillate trunk.